(12) United States Patent
Rothman et al.

(10) Patent No.: US 7,886,190 B2
(45) Date of Patent: Feb. 8, 2011

(54) SYSTEM AND METHOD FOR ENABLING SEAMLESS BOOT RECOVERY

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 11/540,333

(22) Filed: Sep. 29, 2006

(65) Prior Publication Data

US 2008/0155331 A1      Jun. 26, 2008

(51) Int. Cl.
  *G06F 11/00*      (2006.01)
(52) U.S. Cl. .............................................. 714/36
(58) Field of Classification Search ............... 714/36
  See application file for complete search history.

(56) References Cited

U.S. PATENT DOCUMENTS

| | | | | |
|---|---|---|---|---|
| 5,708,776 | A * | 1/1998 | Kikinis | 714/55 |
| 6,173,417 | B1 * | 1/2001 | Merrill | 714/15 |
| 6,195,420 | B1 * | 2/2001 | Tognazzini | 379/130 |
| 6,195,695 | B1 * | 2/2001 | Cheston et al. | 709/221 |
| 6,393,560 | B1 * | 5/2002 | Merrill et al. | 713/2 |
| 7,136,994 | B2 * | 11/2006 | Zimmer et al. | 713/2 |
| 7,340,638 | B2 * | 3/2008 | Nicholson et al. | 714/6 |
| 7,509,530 | B2 * | 3/2009 | Welts | 714/15 |
| 2006/0143431 | A1 | 6/2006 | Fish | |
| 2008/0040458 | A1 * | 2/2008 | Zimmer et al. | 709/220 |
| 2008/0244598 | A1 * | 10/2008 | Tolopka et al. | 718/104 |

\* cited by examiner

*Primary Examiner*—Robert Beausoliel
*Assistant Examiner*—Amine Riad
(74) *Attorney, Agent, or Firm*—Joni D. Stutman (57) ABSTRACT

In some embodiments, the invention involves a system and method relating to autonomic boot recovery. In at least one embodiment, the present invention utilizes an embedded partition to safeguard boot information to be used in the event of a boot failure. An agent within a VMM may be similarly used. The embedded partition or VMM agent enables the preservation of "Last Known Good" boot configurations as well as providing an agent to provide self-healing to a platform which might have run into some type of corruption of critical data. In some embodiments a variety of intelligent filter mechanisms are enabled to allow a user to target the preservation of only certain types of configuration data. Other embodiments are described and claimed.

23 Claims, 4 Drawing Sheets

SYSTEM AND METHOD FOR ENABLING SEAMLESS BOOT RECOVERY

CROSS-REFERENCE TO RELATED APPLICATIONS

This application is related to U.S. patent application Ser. No. 10/956,233, entitled, "METHOD TO PROVIDE AUTONOMIC BOOT RECOVERY," filed on Sep. 30, 2004 by Michael A. Rothman, et al., assigned to a common assignee, the entire subject matter which is herein incorporated by reference.

FIELD OF THE INVENTION

An embodiment of the present invention relates generally to start up of computing devices and, more specifically, to autonomic boot recovery using a protected non-volatile store inaccessible to the boot firmware to maintain last known good boot information.

BACKGROUND INFORMATION

Various mechanisms exist for recovering a platform from a bad boot. Often re-booting the platform is the first method attempted by the platform for recovery. Boot sector viruses attempt to infect the boot sector of the firmware, resulting in the operating system (OS) not being able to launch properly. Malicious, as well as inadvertent, actions may prevent the OS from loading properly. If the boot sector has been damaged, either by accident, or by malicious code, human operator intervention is often required to boot the platform. Some systems without directly connected media will boot from a remote boot device. In legacy systems, the boot vector, or pointer to the remote location, resides in non-volatile memory within the boot sector. If a system is without media, then the pointer to the remote boot device typically cannot be altered without removing the boot sector firmware and either rewriting or replacing it. If the boot vector is tampered with, then the platform cannot boot properly.

Often-times a platform's inability to boot may be a simple platform setting or corruption of boot target definition. In terms of legacy terminology, this might encompass a BBS setting corruption, a partition entry corruption, bad CMOS setting, etc.

Today, there is no consistent policy mechanism to provide persistent roll-back and policy recovery for a platform. In existing systems, there is no method for graceful platform degradation. Existing systems will typically either duplicate a flash block and force a total rollback or else do nothing (e.g., revert to manufacturer defaults).

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to an automatic recovery scheme to ensure a validated assertion that what is being preserved as a "known good" value is in actuality a valid setting. In addition, this invention is applicable to a wide variety of platforms. Embodiments may be applied to existing platforms, by using a private non-volatile (NV) store, as well as platforms that are slated for future platforms, available for instance, from Intel Corporation, which enable chipset-based I/O routing of such NV abstractions (e.g. platform resource layer (PRL)/partitioning initiatives). Future platforms may avail themselves of a "locked" NV store which may contain qualified backup boot data and have recovery policies which do not have to be enacted by existing systems. This may be done because of the behavior of a Platform Partition NV abstraction agent in the platform.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
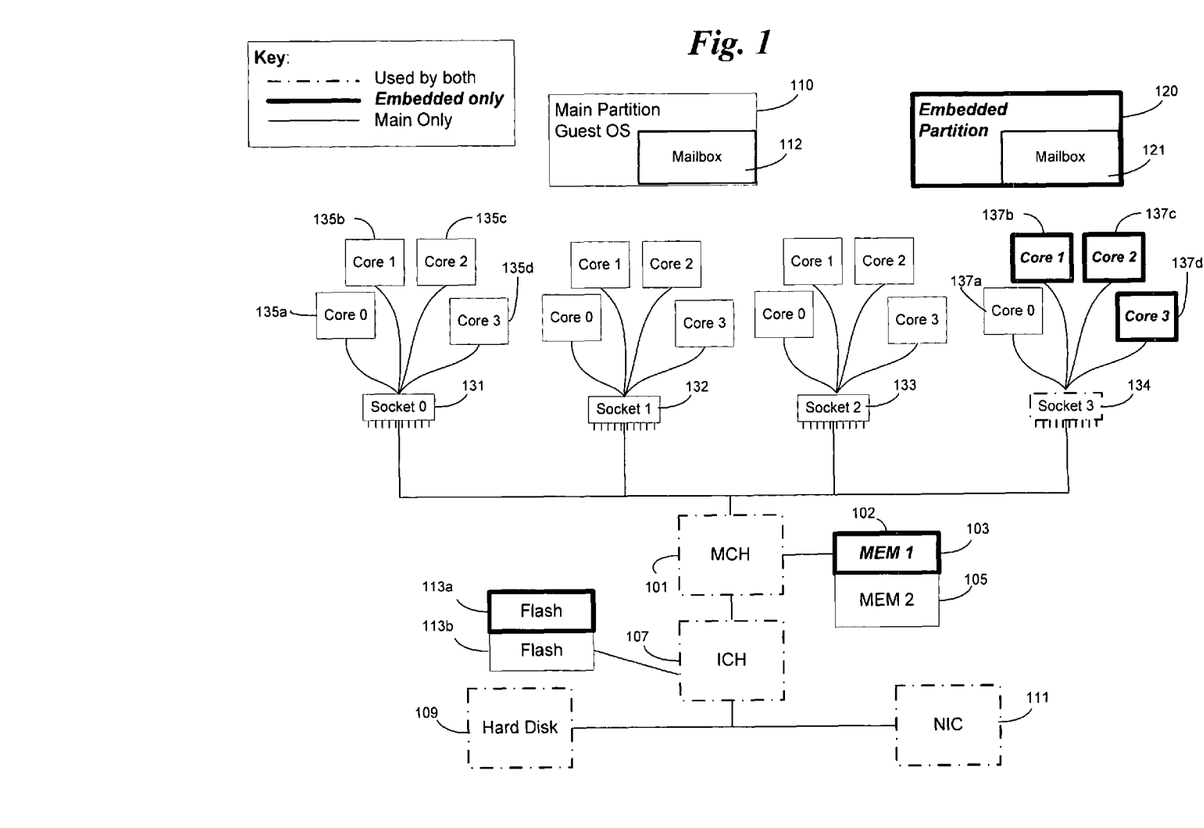
FIG. 1 is a block diagram showing an exemplary embedded partition on a platform with multiple partitions, according to an embodiment of the invention.

FIG. 1 is a block diagram of an exemplary architecture enabling chipset partitioning and seamless boot recovery, according to embodiments of the invention. To better illustrate partitioning, components that are available to the main partition 110 are drawn with solid blocks. Components available to the embedded, or system partition 120, are drawn with bold, solid blocks. Components available to both partitions are drawn with a block alternating with dots and dashes.

In this exemplary embodiment, a platform has four multi-core processors in Sockets 0-3 (131-134). While this example shows only four processor sockets, it will be apparent to one of ordinary skill in the art that various configurations of processors and cores may be used to practice embodiments of the invention. For instance, Socket 0 (131) may have four processing cores 135a-d. In essence, in this example, the illustrated embodiment has 16 effective processors on the platform (e.g., four sockets with four cores in each socket). In this example, Sockets 0-2 (131-133) are available only to the main partition 110. Socket 3 (134) is available to both the main partition 110 and to the embedded partition 120. Within Socket 3 (134), core 0 is available only to the main partition 110, and cores 1-3 are available only to the embedded partition 120.

In this embodiment, the platform has a memory controller hub (MCH) 101 (also known as North bridge) coupled to memory 102. Memory 102 may have two partitions MEM0 (103) and MEM2 (105). Memory partition MEM1 (103) is available only to the embedded partition and memory partition MEM2 (105) is available only to the main partition. The chipset containing the MCH is configured to partition the memory using hardware constructs, in contrast to a virtualized architecture with a virtual machine monitor (VMM) solution which uses software constructs to partition guest operating systems. It will be understood that memory 102 may be a hard disk, a floppy disk, random access memory (RAM), read only memory (ROM), flash memory, or any other type of medium readable by processor. Memory 102 may store instructions for performing the execution of embodiments of the present invention. While only two partitions are shown in this example, it will be understood that there may be more than one guest OS, each running in its own partition.

The MCH 101 may communicate with an I/O controller hub (ICH) 107, also known as South bridge, via a peripheral component interconnect (PCI) bus. The ICH 107 may be coupled to one or more components such as PCI hard drives, legacy components such as IDE, USB, LAN and Audio, and a Super I/O (SIO) controller via a low pin count (LPC) bus (not shown). In this example, the ICH 107 is shown coupled to a hard disk drive 109, a network interface controller (NIC) 111, and a flash drive 113.

The MCH 101 is configured to control accesses to memory and the ICH 107 is configured to control I/O accesses. In an embedded partition architecture, the chipset is configured by the firmware, upon boot, to partition the various resources on the platform. In some cases, there may be only one partition and the platform acts like a legacy platform in most respects. In the example shown, there are two partitions, a main partition 110 and an embedded partition (also referred to as a platform partition) 120. Each partition designated is given a unique partition identifier (ID).

In an exemplary embodiment, the main partition has a mailbox 112, and the embedded partition has a mailbox 121 to enable communication between the two partitions. Mailboxes are typically physically stored in a reserved memory location. Often, mailboxes may be accessed through a platform-specific I/O or directly accessed as a distinguished type of reserved memory. In either case, a mailbox is a known reserved memory location that both partitions use as a volatile repository for data storage and retrieval. Alternate embodiments may store mailbox data in a disk-backed file, though this is often less practical due to the long latency of access to the data. Further, portions of non-volatile memory, for instance flash memory, 113 may be partitioned (113a-b) such that only the embedded partition has access to flash portion 113a and both the embedded partition and the main partition may have access to flash portion 113b. In other embodiments, the platform partition may not have access to flash portion 113b. This sequestering of the flash resource enables the embedded partition to secure and update or repair the boot code while prohibiting the main partition OS from accessing the secure and authenticated boot code. This avoids the possibility of the main partition OS from corrupting the boot.

Since the basic input output system (BIOS) portion of non-volatile memory may typically be modified by the OS or applications running within the OS, it is vulnerable to malicious tampering. By partitioning the non-volatile store, areas of the flash 113a are protected from access by the OS in the main partition. Only the embedded partition may be used to store critical boot vector information without risk of tampering.

Many existing systems use the extensible firmware interface (EFI) and its associated flash variables. The EFI is a specification which defines a new model for the interface between operating systems and platform firmware, commonly known as Basic Input Output System (BIOS). The specification version 1.10, published Dec. 1, 2002, along with corrections and updates made in 2003 is available on the public Internet at URL developer-intel-com/technology/efi/main_specification.htm. A unified EFI specification may also be found at www-uefi-org. In the EFI boot location specification, instead of wholly depending on pointers to a single boot location, a series of boot variables are used. The boot variables specify from which location the platform should boot. EFI systems store the boot variables in non-volatile memory, typically flash memory. This standard architecture is convenient for implementing embodiments of the present invention because the location of the boot variables is well defined. It should be noted that periods have been replaced with dashes in URLs identified in this document to avoid unintended hyperlinks.

Using EFI, the platform may have boot variables and a boot order list. For instance, the boot order may dictate that a floppy drive (A:\) is booted from first. The policy may dictate that a hard drive is booted from next, a CD is booted from next, etc. The boot order list may include network targets for boot. In some existing systems, an application may write over a boot variable. Some legacy systems not using the EFI architecture store boot information in CMOS, using proprietary formats. Embodiments of the present invention utilize a hardware protected (via partition) region 113a of the non-volatile memory 113 and make the protected region inaccessible to an OS in any other partition. The partitioning chipset of the platform controls this protected portion of the non-volatile memory 113. Thus, the firmware (BIOS) cannot access the protected portion 113a. Further, applications running under the main partition OS cannot directly communicate with the embedded partition. Therefore, these applications have no access to the protected portion 113a.

In a chipset enabled partitioning architecture, an arbitration mechanism may enable simultaneous partition access. The chipset construct seamlessly prevents clients from accessing blocks of the flash memory 113 that are not owned by the client.

With the introduction of multi-processors with multi-core, for instance, from Intel Corporation, platforms will be deployed with a significant increase in processing power, as compared to legacy systems. The additional processing power and ability to partition operating systems and management functions on the platform (using embedded partition or VMM technology) allows some management or privileged tasks to operate in a separate partition and be protected from the operating system.

Embodiments of the invention may be an advantage over the technique disclosed in U.S. patent application Ser. No. 10/956,233, entitled, "METHOD TO PROVIDE AUTONOMIC BOOT RECOVERY," in that additional hardware (e.g., a separate out-of-band microprocessor) is no longer required to achieve a similar result. The additional processing power in multi-processor and multi-core platforms with an embedded partitioning chipset enable a technique to enable seamless boot recovery without adding costs for an additional, dedicated processor. Instead, the boot recovery processes may be executed in an embedded partition of the main processor.

Figure 2A:
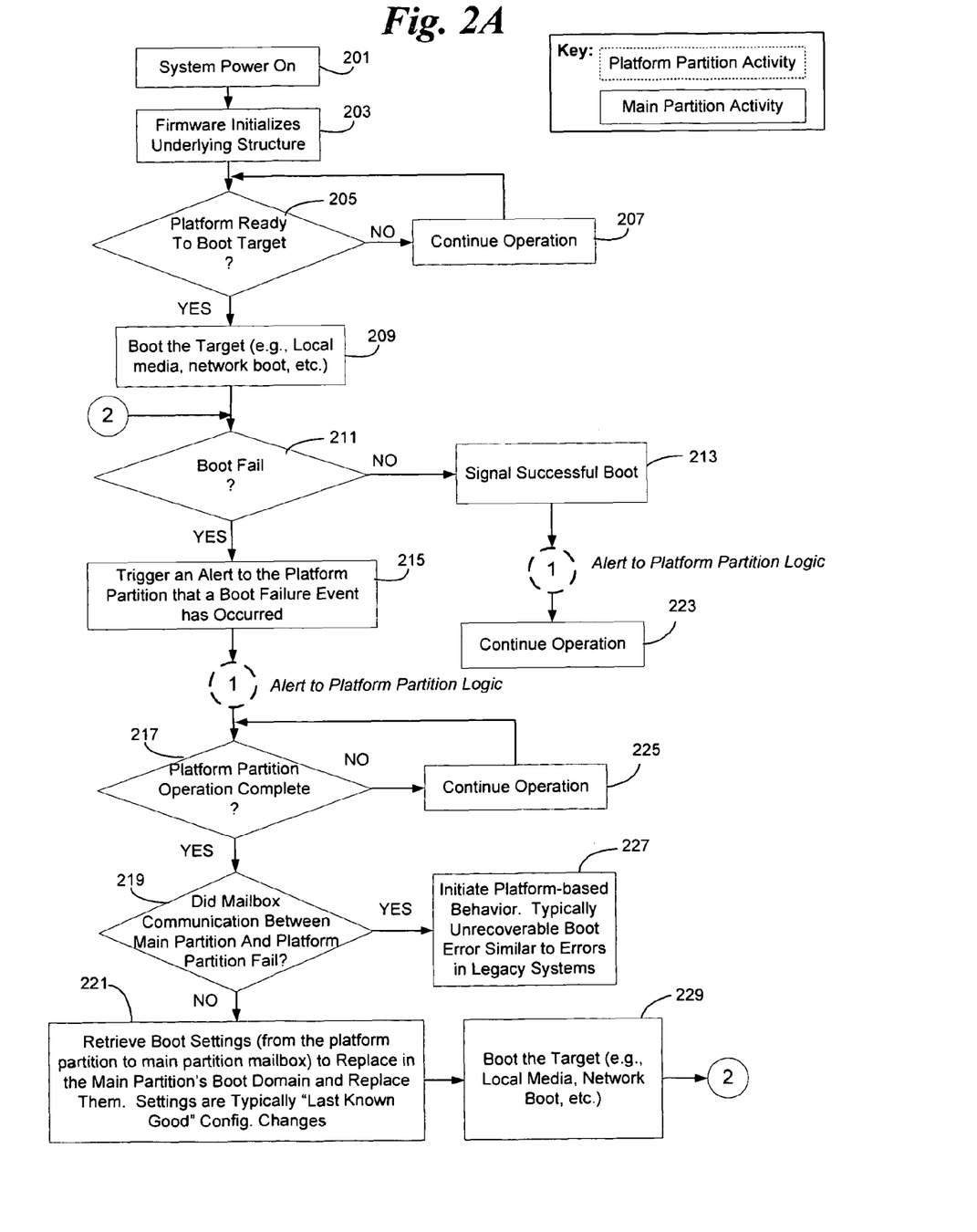
FIGS. 2A-B are flow diagrams showing a method for boot recovery, according to an embodiment of the invention.
Figure 2B:
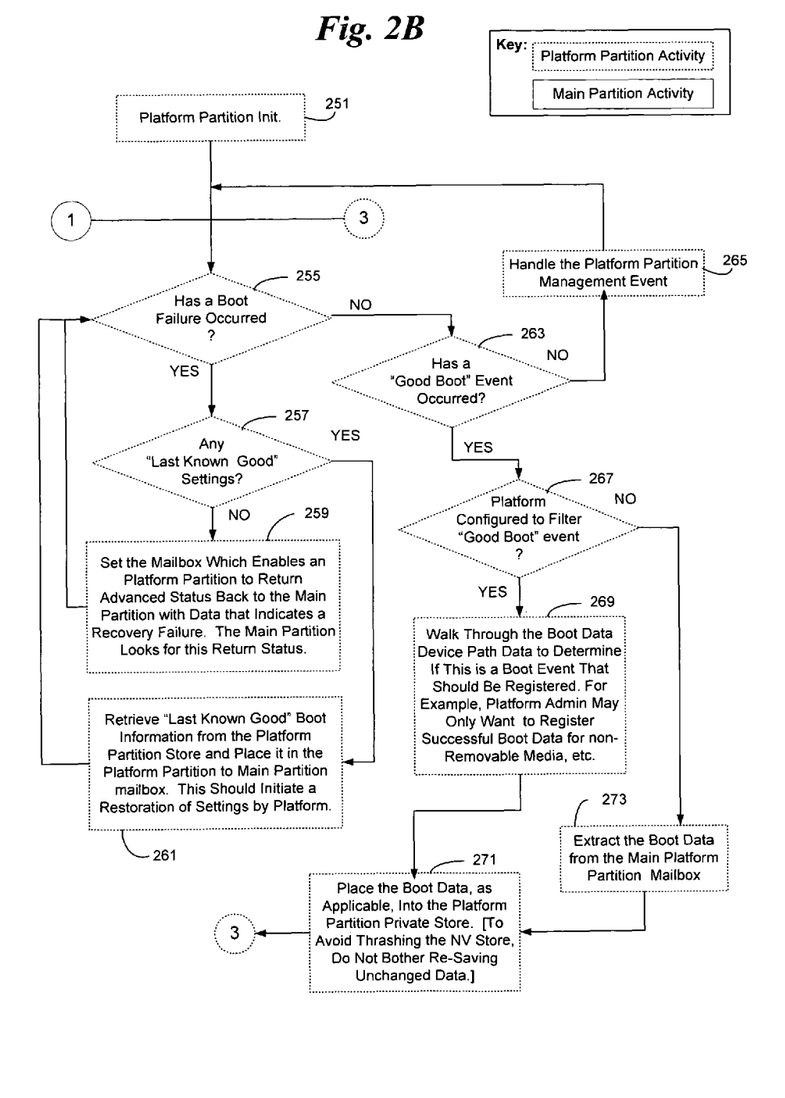

Referring now to FIGS. 2A and 2B, there is shown an exemplary method for enabling seamless boot recovery, according to embodiments of the invention. For illustration purpose, activities that are performed within the main partition are shown in solid blocks. Activities that are performed in the platform partition, also described herein as an embedded partition, are showing in broken dash blocks. It should be understood that since the partitions have their own dedicated resources, including processors, that some activities may be performed in parallel with regard to the two or more partitions. For illustrative purpose, the following discussion describes a boot of a main partition. It will be understood by those skilled in the art that multiple user partitions may be configured on the platform and a similar method will be performed to boot each one.

Referring to FIG. 2A, the system is powered on, or reset, in block 201. The firmware initializes the underlying structure, for instance a power on self test (POST) operation in block 203. A determination is made as to whether the platform is ready to boot a target operating system (OS) in a main partition, in block 205. If not, POST or other initialization activities continue in block 207. Once the platform is ready to boot the target, booting commences from the boot target media in block 209.

If the boot fails, as determined in block 211, then an alert is triggered to notify the platform partition that a boot failure has occurred, in block 215. The alert may be a direct communication through a general purpose I/O register (GPIO) or through a shared mailbox. If the boot succeeds, then a successful boot signal is sent to the platform partition in block 213. Once the alert to a successful boot is sent, the main partition continues operation in block 223. However, as discussed below, the platform partition receives this alert and takes appropriate action.

When a boot failure signal is sent, the main partition waits for a reply signal from the platform partition (blocks 217 and 225). Actions taken by the platform partition, in response to these alerts, are discussed in conjunction with FIG. 2B. Upon power on, the platform partition also initializes, in block 251. The platform partition may be configured to perform a variety of tasks. Some activities may be alert or signal driven. When an alert is received by the platform partition, a determination is made as to whether a boot failure has occurred in another partition, in block 255. If so, then a determination is made as to whether a "last known good" setting has been saved in block 257. When a boot failure occurs, it is often due to configuration settings being corrupted, or the BIOS code becoming corrupted. A last known good setting may comprise configuration data and/or an entire flash image of the BIOS or boot code that would have been read from the boot target device. If this data has been previously saved by the platform partition, then it may be retrieved in block 261. In an embodiment, the platform partition has no access to the main partition flash. In this case, the "last known good" data is placed in a mailbox accessible to the main partition. This mailbox is typically polled by the main partition and will trigger a reboot. In another embodiment, the platform partition has access to the main partition flash and rewrites the appropriate portions of the boot code directly. In this case, the platform partition may initiate a reboot of the main partition directly.

If no "last known good" settings are available, then the mailbox may be set to enable the platform partition to return a failure status to the main partition in block 259. The main partition will find this notification and take appropriate action. One action might be to initiate a hard boot. Another action might be to notify a user or remote processor.

If a boot failure was not identified, a determination is made as to whether a "good boot" event has occurred in block 263. If not, the notification is likely to be unrelated to a boot event and is typically another partition management event to be handled in block 265. The platform partition then continues to wait for other events to handle.

If a "good boot" event has occurred, then a determination is made as to whether the platform is configured to filter the event, in block 267. Filtering of boot events may be desirable in some situations. For instance, the platform may not wish to store "good settings" for some targets, or when booting from specific target boot media, i.e., a floppy drive. If filtering is desired, then the platform partition walks through the boot data device path data to determine whether this boot event should be registered, in block 269. If filtering is not to take place, then the boot data is extracted from the main platform mailbox, in block 273. In this case, and also when filtering is determined to register the "good boot" data, the boot data is placed into the platform partition private store, for future recovery use, in block 271. Optionally, to avoid thrashing in the non-volatile store, unchanged data is not saved. The platform partition then waits for another event to handle.

Referring again to FIG. 2A, when the platform partition activity is complete, as determined in block 217, a determination is made as to whether the mailbox (or other) communication between the main partition and platform partition failed, in block 219. If there was a failure, then a predetermined platform-based action is performed. In some cases this may be to signal an unrecoverable boot error similar to that of legacy systems. If there was no mailbox failure, then the last known good boot settings retrieved by the platform partition are retrieved from the mailbox in block 221. In some cases, as discussed above, the platform partition may rewrite this information directly to the flash and this action will be unnecessary. The boot settings are then replaced or corrected, as necessary, and then the target is rebooted in block 229.

Figure 3:
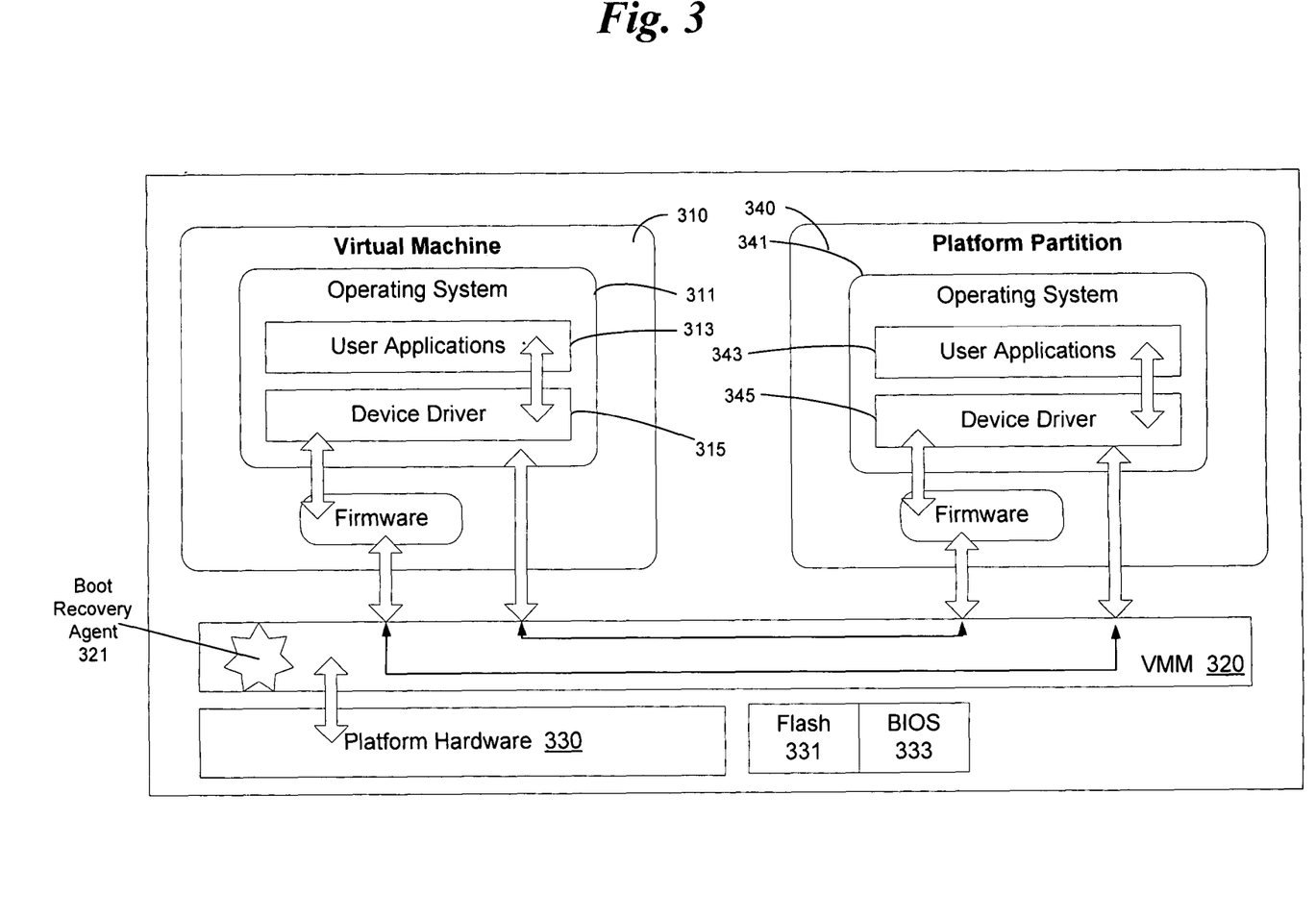
FIG. 3 is a block diagram of an exemplary platform where the boot recovery agent resides in a virtual machine monitor (VMM), according to an embodiment of the invention.

In an embodiment, a boot recovery agent resides in a virtual machine monitor (VMM) on a virtualization platform. Referring now to FIG. 3, an exemplary virtualization platform where the boot recovery agent 321 resides in a VMM is shown. In this exemplary embodiment, a virtual machine (VM) 310 has a guest OS 311. Various user applications 313 may run under the guest OS 311. The OS has device drivers 315 which may be virtualized within the VMM 320. Access to platform hardware 330 will require the use of the VMM. In the case of booting, a boot recovery agent 321 within the VMM 320 may intercept device access to the boot target and flash/BIOS (331/333) memory.

Similarly, a platform partition, or more privileged partition 340 having its own OS 341, user applications 343, device drivers 345 is shown. This platform partition may also have virtualized devices via the VMM 320. In some cases, the boot recovery agent will recover boot data and configurations for this partition (VM), as well.

For purposes of understanding this embodiment, the term "VMM" may be replaced by "chipset" and "VM" replaced by "partitions" as analogous to discussions above. The primary differences between the embodiments in PRL (embedded partitions) versus VMM would be associated with the actor, or agent. During PRL (platform partition) initialization 251, the chipset may be initialized to trap on predetermined I/O transactions to cause alerts/interrupts when they occur. These alerts/interrupts (sent by the chipset) trigger a handler to act on the event (e.g. read from mailbox, etc). For a VMM embodiment, the initialization is contained within the VMM modeling of the underlying hardware. The actor may be an agent within the VMM. When the VMM forces an alert/interrupt in a particular VM, the appropriate handler would then act on this event (e.g. read from mailbox, etc). Otherwise, the boot recovery agent acts as discussed for FIG. 2B.

Notification that an event is pending may be performed in more than one way. An agent may poll the mailbox looking for new inbound data, or the VMM may act as an intermediary triggering an alert/interrupt in the destination VM's context so that the interrupt handler in the receiving VM reads the mailbox for the received data. In some virtualization platforms a hardware trigger occurs to enter and exit the VMM control from VM control. In this case, polling is not needed, but the platform hardware must conform to this architecture. The technique of polling of mailboxes may be implemented on most platforms, but has the overhead of frequently accessing the mailbox, even when it is empty.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for autonomic boot recovery in a platform, comprising:

a platform having a first execution partition running an operating system and a second execution partition running a boot recovery agent, wherein the first and second execution partitions comprise at least one of an embedded hardware partition, a virtual machine partition or virtual machine monitor;

the first execution partition being communicatively coupled to a non-volatile (NV) memory store, the NV memory store to store firmware boot information configured to boot the platform and load an operating system, the first execution partition having access to a shared storage area for passing messages to and from the second execution partition; and the second execution partition being communicatively coupled to a protected non-volatile (NV) memory store, the protected NV memory store being inaccessible to both a boot firmware and the operating system running in the first execution partition, the second execution partition having access to the shared storage area for passing messages to and from the first execution partition, the second execution partition to store last known good boot information in the protected NV memory store, and to initiate recovery using the last known good boot information when a boot failure of the first execution partition is identified.

2. The system as recited in claim 1, wherein the second execution partition is configured to forward the last known good boot information to the first execution partition via the shared storage area when a boot failure is identified.

3. The system as recited in claim 1, wherein the second execution partition is configured to replace the firmware boot information in the NV memory store with the last known good boot information saved in the protected NV memory store, and notify the first execution partition via the shared storage area when a boot failure is identified.

4. The system as recited in claim 1, wherein the first execution partition comprises an unprivileged partition in a chipset partition enabled platform and the second execution partition comprises a privileged partition in the platform, wherein platform resources are partitioned at boot time, by the firmware.

5. A system for autonomic boot recovery in a platform, comprising:
 a platform having a first execution partition running an operating system and a second execution partition running a boot recovery agent, wherein the first and second execution partitions comprise at least one of an embedded partition or a virtual machine partition;
 the first execution partition being communicatively coupled to a non-volatile (NV) memory store, the NV memory store to store firmware boot information configured to boot the platform and load an operating system, the first execution partition having access to a shared storage area for passing messages to and from the second execution partition; and
 the second execution partition being communicatively coupled to a protected non-volatile (NV) memory store, the protected NV memory store being inaccessible to both a boot firmware and the operating system running in the first execution partition, the second execution partition having access to the shared storage area for passing messages to and from the first execution partition, the second execution partition to store last known good boot information in the protected NV memory store, and to initiate recovery using the last known good boot information when a boot failure of the first execution partition is identified,
 wherein the first execution partition comprises a virtual machine running a guest operating system and the second execution partition comprises a privileged virtual machine monitor (VMM) having a boot recovery agent, wherein platform resources are virtualized by the VMM and access to the platform resources is controlled by the VMM.

6. The system as recited in claim 1, wherein the second execution partition is to replace firmware boot information with last known good boot information, and to notify the first execution partition of the replacement to initiate a reboot.

7. The system as recited in claim 1, wherein the first execution partition is configured to alert the second execution partition upon a successful boot.

8. A method for autonomic boot recovery of a first execution partition on a platform, comprising:
 a second execution partition on the platform receiving an indication from the first execution partition, when the first execution partition has booted successfully, wherein the first and second execution partitions comprise at least one of an embedded hardware partition, a virtual machine partition or virtual machine monitor;
 determining, by the second execution partition, last known good boot settings for the first execution partition;
 storing, by the second execution partition, the last known good boot settings in a protected memory store not accessible to the first execution partition;
 identifying, by the second execution partition, when the first execution partition has failed to boot properly; and
 initiating, by the second execution partition, a reboot of the first execution partition when the first execution partition has failed to boot properly, using the last known good boot settings.

9. The method as recited in claim 8, wherein determining the last known good boot settings further comprises saving good boot settings after a successful boot only when dictated by a platform filtering policy.

10. The method as recited in claim 8, wherein initiating a reboot further comprises:
 retrieving, by the second execution partition, last known good boot settings from the protected memory store;
 placing the last known good boot settings in a memory store accessible to the first execution partition; and
 notifying the first execution partition that good boot settings are available.

11. The method as recited in claim 10, wherein placing the last known good boot settings comprises a selected one of (a) the second execution partition directly replacing current firmware boot settings in boot firmware with the last known good boot settings, the current firmware boot settings having caused the boot failure, and then notifying the first execution partition of the replacement; or (b) the second execution partition placing the last known good settings in a shared memory accessible by both the first and second execution partitions, and notifying the first execution partition of the placement.

12. The method as recited in claim 11, where notification to the first execution partition is accomplished by posting a message to a mailbox, wherein the first execution partition polls the mailbox for new messages on a periodic basis.

13. The method as recited in claim 8, wherein the first execution partition comprises an unprivileged partition in a chipset partition enabled platform and the second execution partition comprises a privileged partition in the platform, wherein platform resources are partitioned at boot, by the firmware.

14. A method for autonomic boot recovery of a first execution partition on a platform, comprising:
 a second execution partition on the platform receiving an indication from the first execution partition, when the first execution partition has booted successfully;
 determining, by the second execution partition, last known good boot settings for the first execution partition;
 storing, by the second execution partition, the last known good boot settings in a protected memory store not accessible to the first execution partition;
 identifying, by the second execution partition, when the first execution partition has failed to boot properly; and
 initiating, by the second execution partition, a reboot of the first execution partition when the first execution partition has failed to boot properly, using the last known good boot settings,
 wherein the first execution partition comprises a virtual machine running a guest operating system and the second execution partition comprises a privileged virtual machine monitor (VMM) having a boot recovery agent, wherein platform resources are virtualized by the VMM and access to the platform resources is controlled by the VMM.

15. A non-transitory machine readable storage medium having instructions stored thereon for autonomic boot recovery of a first execution partition on a platform, the instructions when executed on the platform cause a second execution partition on the platform to:
 receive an indication when the first execution partition has booted successfully;
 determine last known good boot settings for the first execution partition;

store the last known good boot settings in a protected memory store not accessible to the first execution partition;

identify when the first execution partition has failed to boot properly; and initiate a reboot of the first execution partition, when the first execution partition has failed to boot properly, using the last known good boot settings, wherein the first and second execution partitions comprise at least one of an embedded hardware partition, a virtual machine partition or virtual machine monitor.

16. The medium as recited in claim 15, wherein determining the last known good boot settings further comprises saving good boot settings after a successful boot only when dictated by platform filtering policy.

17. The medium as recited in claim 15, wherein initiating a reboot comprises instructions that when accessed cause the second execution partition to:

retrieve the last known good boot settings from the protected memory store;

place the last known good boot settings in a memory store accessible to the first execution partition; and notify the first execution partition that good boot settings are available.

18. The medium as recited in claim 17, wherein instructions to place the last known good boot settings causes the second execution partition to perform a selected one of (a) directly replace current firmware boot settings in boot firmware with the last known good boot settings, the current firmware boot settings having caused the boot failure, and then notify the first execution partition of the replacement; or (b) place the last known good settings in a shared memory accessible by both the first and second execution partitions, and notify the first execution partition of the placement.

19. The medium as recited in claim 18, where notification to the first execution partition is accomplished by posting a message to a mailbox portion of the shared memory, wherein the first execution partition polls the mailbox for new messages on a periodic basis.

20. The medium as recited in claim 15, wherein the first execution partition comprises an unprivileged partition in a chipset partition enabled platform and the second execution partition comprises a privileged partition in the platform, wherein platform resources are partitioned at boot, by the firmware.

21. A non-transitory machine readable storage medium having instructions stored thereon for autonomic boot recovery of a first execution partition on a platform, the instructions when executed on the platform cause a second execution partition on the platform to:

receive an indication when the first execution partition has booted successfully;

determine last known good boot settings for the first execution partition;

store the last known good boot settings in a protected memory store not accessible to the first execution partition;

identify when the first execution partition has failed to boot properly; and initiate a reboot of the first execution partition, when the first execution partition has failed to boot properly, using the last known good boot settings, wherein the first and second execution partitions comprise at least one of an embedded hardware partition, a virtual machine partition or virtual machine monitor, wherein the first execution partition comprises a virtual machine running a guest operating system and the second execution partition comprises a privileged virtual machine monitor (VMM) having a boot recovery agent, wherein platform resources are virtualized by the VMM and access to the platform resources is controlled by the VMM.

22. A method for autonomic boot recovery of a first execution partition on a platform, comprising:

a second execution partition on the platform receiving an indication from the first execution partition, when the first execution partition has booted successfully;

determining, by the second execution partition, last known good boot settings for the first execution partition;

storing, by the second execution partition, the last known good boot settings in a protected memory store not accessible to the first execution partition;

identifying, by the second execution partition, when the first execution partition has failed to boot properly; and initiating, by the second execution partition, a reboot of the first execution partition when the first execution partition has failed to boot properly, using the last known good boot settings, wherein initiating a reboot further comprises:

retrieving, by the second execution partition, last known good boot settings from the protected memory store;

placing the last known good boot settings in a memory store accessible to the first execution partition; and notifying the first execution partition that good boot settings are available, wherein placing the last known good boot settings comprises a selected one of (a) the second execution partition directly replacing current firmware boot settings in boot firmware with the last known good boot settings, the current firmware boot settings having caused the boot failure, and then notifying the first execution partition of the replacement; or (b) the second execution partition placing the last known good settings in a shared memory accessible by both the first and second execution partitions, and notifying the first execution partition of the placement, where notification to the first execution partition is accomplished by posting a message to a mailbox, wherein the first execution partition polls the mailbox for new messages on a periodic basis.

23. A non-transitory machine readable storage medium having instructions stored thereon for autonomic boot recovery of a first execution partition on a platform, the instructions when executed on the platform cause a second execution partition on the platform to:

receive an indication when the first execution partition has booted successfully;

determine last known good boot settings for the first execution partition;

store the last known good boot settings in a protected memory store not accessible to the first execution partition;

identify when the first execution partition has failed to boot properly; and initiate a reboot of the first execution partition, when the first execution partition has failed to boot properly, using the last known good boot settings, wherein initiating a reboot comprises instructions that when accessed cause the second execution partition to:

retrieve the last known good boot settings from the protected memory store;

place the last known good boot settings in a memory store accessible to the first execution partition; and notify the first execution partition that good boot settings are available, wherein instructions to place the last known good boot settings causes the second execution partition to perform a selected one of (a) directly replace current firmware boot settings in boot firmware with the last known good boot settings, the current firmware boot settings having caused the boot failure, and then notify the first execution partition of the replacement; or (b) place the last known good settings in a shared memory accessible by both the first and second execution partitions, and notify the first execution partition of the placement, where notification to the first execution partition is accomplished by posting a message to a mailbox portion of the shared memory, wherein the first execution partition polls the mailbox for new messages on a periodic basis.

* * * * *